Nov. 15, 1955 K. PETERS 2,723,838
APPARATUS FOR MIXING AND HOMOGENIZING
PULVERULENT OR FINE-GRAINED MATERIALS
Filed Nov. 12, 1953 3 Sheets-Sheet 1

INVENTOR.
Karl PETERS

Nov. 15, 1955  K. PETERS  2,723,838
APPARATUS FOR MIXING AND HOMOGENIZING
PULVERULENT OR FINE-GRAINED MATERIALS
Filed Nov. 12, 1953  3 Sheets-Sheet 3

INVENTOR.
Karl PETERS
BY

United States Patent Office 2,723,838
Patented Nov. 15, 1955

2,723,838

APPARATUS FOR MIXING AND HOMOGENIZING PULVERULENT OR FINE-GRAINED MATERIALS

Karl Peters, Hardegsen, near Norten-Hardenberg, Germany, assignor to Klockner-Humboldt-Deutz A. G., Koln-Deutz, Germany Application November 12, 1953, Serial No. 391,680

Claims priority, application Germany November 15, 1952

15 Claims. (Cl. 259—36)

This invention relates to mixers and more particularly to an apparatus for the mixing and homogenizing of pulverulent or fine-grained materials, such as raw cement powder, by means of compressed air.

An object of the invention is to provide a mixer by means of which a perfectly homogenized mixed product may be obtained.

Another object of the invention is to improve on the art of mixers as now customarily made.

Figure 1:
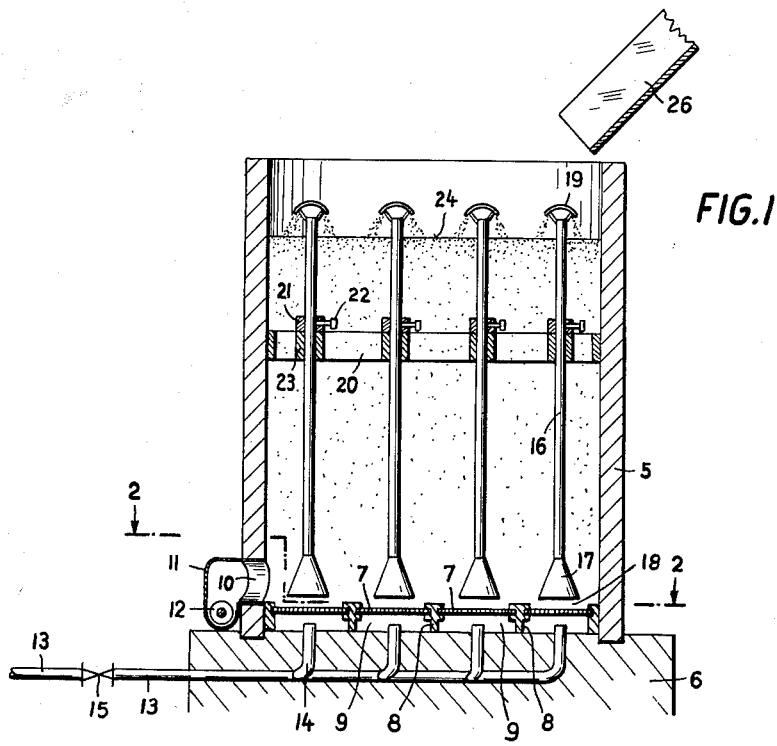
Figure 2:
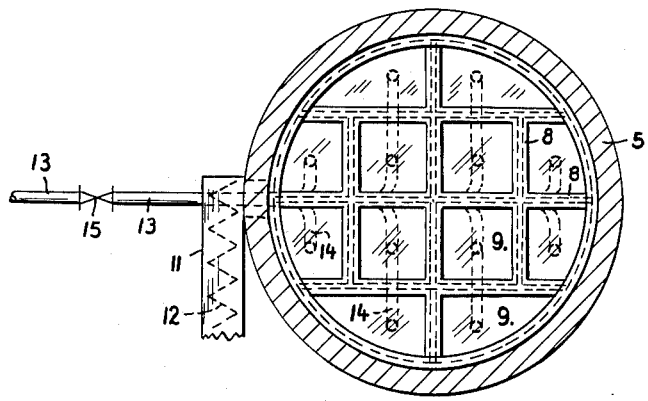
Figure 3:
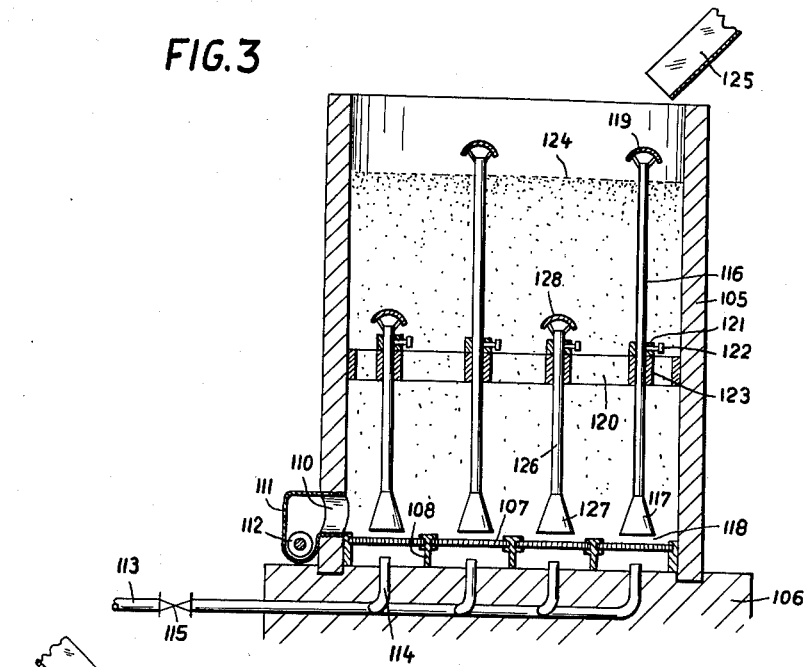
Figure 4:
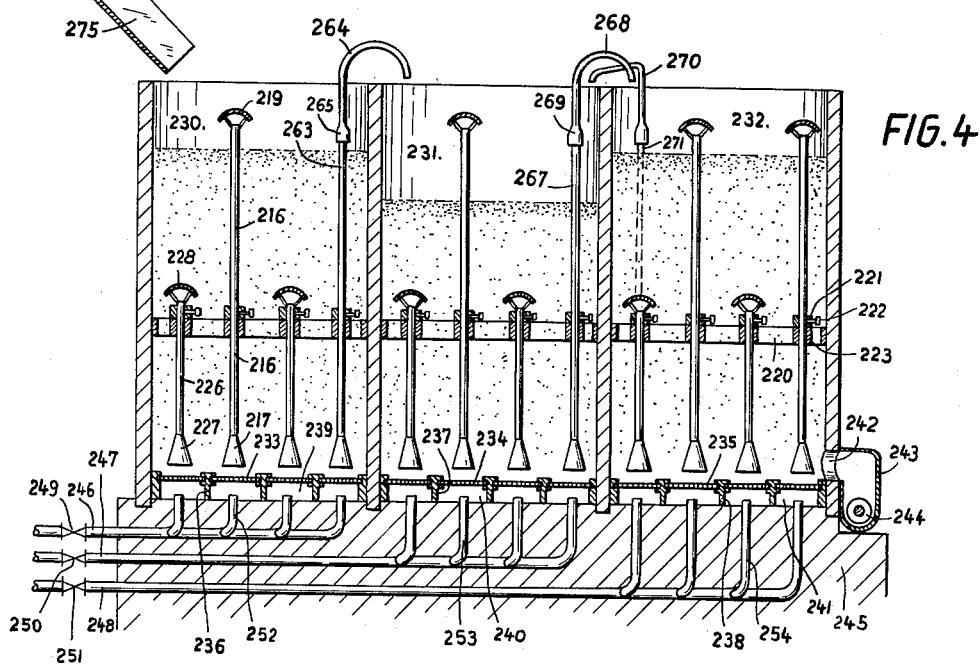
Figure 5:
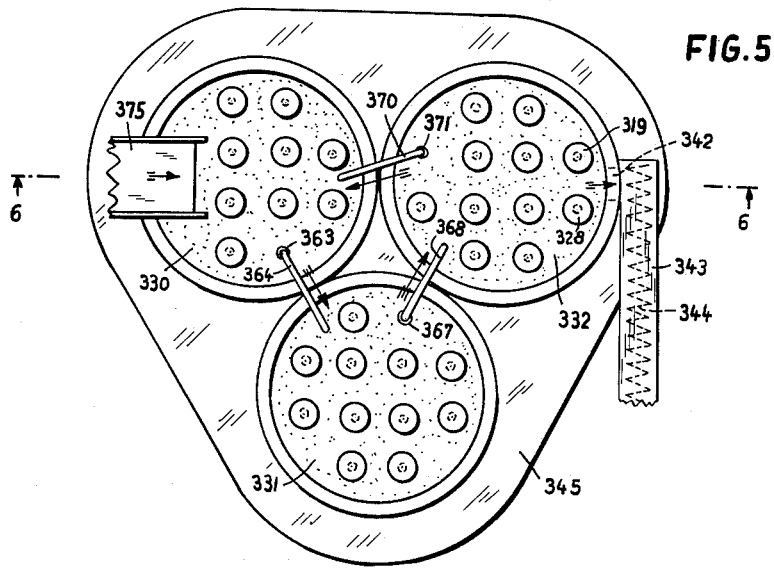
Figure 6:
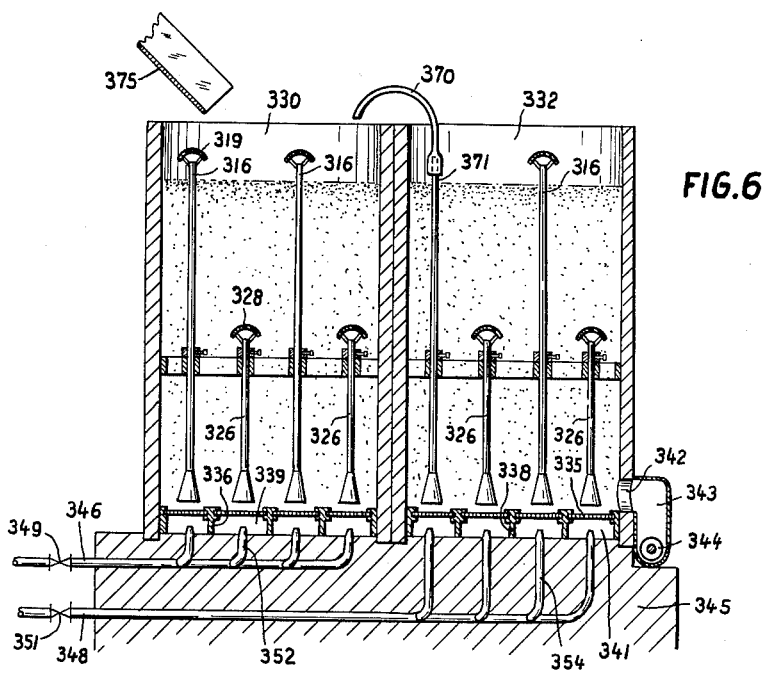

Other objects and structural details of the invention will be apparent from the following description when read in conjunction with the accompanying drawings, wherein:

Fig. 1 is a vertical sectional view of a mixer according to the invention,

Fig. 2 is a horizontal sectional view of the mixer shown in Fig. 1, taken on line 2—2 of Fig. 1, Fig. 3 is a vertical sectional view of another embodiment of a mixer according to the invention, Fig. 4 is a vertical sectional view of a plant including three mixers according to the invention, Fig. 5 is a ground plan of another plant including three mixers according to the invention, and Fig. 6 is a vertical sectional view of the plant shown in Fig. 5, taken along the line 6—6 of Fig. 5.

Referring now to Figs. 1 and 2, the mixer according to the invention comprises a cylindrical container 5 mounted on a foundation 6. A grating 8 rests on the foundation within the container 5. The individual fields 9 of the grating 8 are covered by plates permeable to air, for example porous ceramic plates 7. Said plates 7 form the bottom of the container. The open ends of a series of pipes 14 for compressed air enter into each of the fields 9. All of the pipes 14 communicate with a conduit 13 for compressed air, said conduit 13 including a valve 15. The wall of the container 5 has an opening 10 located immediately above the bottom 7. An open projecting portion of a housing 11 is inserted into said opening 10. A conveyor worm 12 is rotatably arranged in said housing 11.

A plurality of vertical tubes 16 is arranged within the container 5. Preferably, the number and arrangement of said tubes 16 are chosen in such a way that one tube is associated with each field 9 and that each tube is arranged approximately above the center of the associated field. Each tube 16 passes through a sleeve 23. Said sleeves 23 are attached to the wall of the container 5 by means of flat irons 20 arranged in the shape of a grating. A set collar 21 is attached to each tube 16 by means of a set screw 22. The upper end of each tube 16 projects somewhat beyond the level or upper surface 24 of the material delivered into the container 5. Preferably, the upper open end of each tube 16 is covered by a cap 19. The lower end of each tube 16 has a cone-like or trumpet-shaped enlargement 17. Preferably, the diameter at the mouth of the enlargement 17 is four times to six times as large as the diameter of the tube 16 proper. The enlarged lower end of each tube 16 terminates somewhat above the bottom 7 of the container 5 leaving a space 18 between the mouth of the enlargement and said bottom 7. Said space 18 may be adjusted to the requirements of the material to be treated by means of an adjustment of the set collar 21 on the respective tube 16.

The operation of the mixer shown in Figs. 1 and 2 is as follows:

The material to be mixed and homogenized is supplied continuously or intermittently to the container 5 by means of a bucket elevator or any other suitable conveyor (not shown), and flows into the container 5 through the chute 26.

Compressed air supplied to the fields 9 by opening the valve 15 is blown into the container 5 through the porous bottom 7. A portion of said compressed air, which passes through parts of the porous bottom 7 located below the mouths of the enlargements 17 of the tubes 16, enters into said enlargements and flows through said tubes. The remainder of the compressed air passes through the contents of the container, for example through a mass of raw cement powder. Thus, the raw powder is brought into a liquid state, so to speak. Therefore, a certain amount of raw powder flows continuously through the spaces 18 below the individual enlargements. This raw powder being mixed with the air ascending at said spaces is carried by the air into the enlargements. The mixture of raw powder and air is subjected to such a high speed in the enlargements owing to the restrictions of the cross-sections, that a lifting of even the largest particles of the material is assured. The mixture of powder and air leaving the upper end of the tubes 16 abuts against the caps 19. The powder rebounding at the caps drops back into the container. Thus, a certain amount of powder is continuously lifted through all of the tubes. It will be readily understood that this operation provides for a thorough mixing and homogenizing of the contents of the container.

The mixed product is discharged from the container by means of the conveyor worm 12. However, if desired, different means for discharging the mixed product could be used.

In many instances it may be of advantage that only some of the tubes terminate above the level of the material in the container. Fig. 3 illustrates such an embodiment. The apparatus has a series of long tubes 116 projecting beyond the upper surface 124 of the material in the container 105 and a series of short tubes 126 terminating below the level 124 of the material in the container 105. The lower ends of the long tubes 116 have the cone-like enlargements 117 and the lower ends of the short tubes 126 have similar cone-like enlargements 127. The upper ends of the short tubes 126 terminating approximately at one half of the height of the column of the material in the container 105 are provided with caps 128 preventing an entry of material into the short tubes 126 when the mixer is filled or stopped. Preferably, the tubes are arranged in such a way that the long and short tubes alternate. Thus, a portion of the material is continuously lifted through the long tubes 116 from the bottom 107 of the container 105 to the top of the column of material in the container while another portion of the material is delivered through the short tubes 126 from the bottom 107 of the container 105 to a level at about half of the height of the column of the material, said operation taking place in a uniform distribution over the entire cross-section of the container. Thus, an especially good mixture and homogenization of the material is obtained.

If desired, two or more mixing containers according to the invention may be arranged next to each other and the containers may be equipped with one or more conveying pipes supplying the material to the adjacent container. Such a plant with three containers and one conveying pipe arranged in each of said three containers is shown in Fig. 4. According to said Fig. 4 three containers 230, 231, 232 with porous bottoms 233, 234, 235 are mounted next to each other on a foundation 245. The spaces between the individual container bottoms and the foundation are divided into fields 239, 240, 241 by gratings 236, 237, 238. Pipes 252, 253, 254 for compressed air, connected with conduits 246, 247, 248 for compressed air, lead to said fields 239, 240, 241. Valves 249, 250 and 251 respectively are arranged in said conduits 246, 247, 248 respectively. Long tubes 216 and short tubes 226 are alternatively arranged in the individual containers. Furthermore, the container 230 is provided with a tube 263 bearing at its upper end a bent pipe or elbow 264 instead of a cap. Said elbow 264 leads to the container 231. Furthermore, a tube 267 bearing at its upper end an elbow 268 is arranged in the container 231. Said elbow 268 leads to the container 232. The container 232 is provided with an opening 242 located immediately above the bottom 235. The open end of a housing 243 containing a rotatable conveyor worm 244 is connected with said opening 242.

During the operation of the plant illustrated by Fig. 4 the portion of the material of the container 230 lifted in the tube 263 is led through the elbow 264 into the adjacent container 231. The portion of the material ascending in the tube 267 of the container 231 is led by the elbow 268 to the next adjacent container 232. Thus, as will be readily understood, the contents of the individual containers may be mixed with each other.

Preferably, the elbows 264 and 268 respectively are swingably mounted on the tubes 263 and 267 respectively by means of pivot bearings 265 and 269 respectively. Thus, depending on the position of the elbows 264 and 268, the material ascending in the tubes 263 and 267 respectively may be selectively supplied to the adjacent container or returned into the container from the bottom of which it has been lifted.

Referring now to Figs. 5 and 6 of the drawings, three containers 330, 331, 332 are arranged in a circle. Above the container 330 a chute 375 is provided for supplying the material to be mixed. The container 332 has an opening 342 immediately above the bottom 335. The open end of a housing 343 containing a rotatable conveyor worm 344 is connected with said opening 342. Long tubes 316 and short tubes 326 are alternately arranged in the individual containers. Furthermore, the container 330 is provided with a tube 363 bearing at its upper end an elbow 364. Said elbow leads to the container 331. Furthermore, a tube 367 bearing at its upper end an elbow 368 is arranged in the container 331. Said elbow leads to the container 332. An elbow 370, arranged on the tube 371 of the container 332 leads to the container 330.

During the operation of the plant illustrated by Figs. 5 and 6 the portion of the material, lifted in the tube 363 is led through the elbow 364 into the container 331. The portion of the material ascending in the tube 367 is led by the elbow 368 to the container 332 and the portion of the material ascending in the tube 371 is led by the elbow 370 to the container 330 again. Thus, a still better mixture of the material will be achieved.

I have described preferred embodiments of my invention, but it is understood that this disclosure is for the purpose of illustration and that various omissions or changes in shape, proportion and arrangement of parts, as well as the substitution of equivalent elements for those herein shown and described, may be made without departing from the spirit and scope of the invention as set forth in the appended claims.

What I claim is:

1. An apparatus for mixing and homogenizing pulverulent or fine-grained materials, comprising in combination: a container, a porous bottom in said container, a device for the supply of compressed air, said device having outlets located below said porous bottom for blowing compressed air through said porous bottom into said container, a plurality of upwardly extending tubes arranged in said container, said tubes being open at both ends, said ends being arranged in said container, the lower ends of said tubes having cone-like enlargements arranged, respectively, above said outlets in said container, said enlargements terminating at a distance above said porous bottom, and means for discharging the material from said container, said discharging means being arranged in the circumferential wall of said container near and above said porous bottom thereof.

2. In an apparatus as claimed in claim 1, said porous bottom being divided into a plurality of fields and at least some of said fields being associated with one of said enlargements of said tubes of said plurality of tubes.

3. In an apparatus as claimed in claim 1, said porous bottom being divided into a plurality of fields, and each of said fields being associated with one of said enlargements of said tubes of said plurality of tubes.

4. In an apparatus as claimed in claim 1, deflecting caps arranged at the upper ends of said tubes arranged in said container, said caps deflecting the fine-granular material conveyed by said tubes to the bulk of the fine-granular material in said container.

5. In an apparatus as claimed in claim 1, said container being capable of receiving a predetermined amount of raw material, and the upper ends of all of said tubes in said container projecting beyond the upper surface of the material contained in said container.

6. An apparatus for mixing and homogenizing pulverulent or fine-grained materials, comprising in combination: a container, a porous bottom in said container, a device for the supply of compressed air, said device having outlets located below said porous bottom for blowing compressed air through said porous bottom into said container, a plurality of first upwardly extending tubes arranged in said container, and a plurality of second upwardly extending tubes arranged in said container, said first and second tubes being open at both ends, the lower ends of said first and second tubes having a cone-like enlargement and terminating at a distance above said porous bottom, and said second tubes being shorter than said first tubes.

7. An apparatus for mixing and homogenizing pulverulent or fine-grained materials, comprising in combination: a container, a porous bottom in said container, said container being capable of receiving a predetermined amount of raw material, a device for the supply of compressed air, said device having outlets located below said porous bottom for blowing compressed air through said porous bottom into said container, a plurality of first upwardly extending tubes arranged in said container, and a plurality of second upwardly extending tubes arranged in said container, said first and second tubes being open at both ends, the lower ends of said first and second tubes having a cone-like enlargement and terminating at a distance above said porous bottom, the upper ends of said first tubes projecting beyond the upper surface of the material contained in said container, and the upper ends of said second tubes terminating below said upper surface of the material.

8. In an apparatus as claimed in claim 6, said porous bottom being divided into a plurality of fields, and each of said fields being associated with a tube of said plurality of first and second tubes.

9. In an apparatus as claimed in claim 6, said first tubes and said second tubes being alternatively arranged.

10. In an apparatus as claimed in claim 6, a deflecting cap being arranged at the upper end of each of said first and second tubes.

11. An apparatus for mixing and homogenizing pulverulent or fine-grained materials, comprising in combination: a plurality of containers arranged next to each other, a porous bottom in each of said containers, a device for the supply of compressed air, said device having outlets located below said porous bottoms for blowing compressed air through said porous bottoms into said containers, a plurality of upwardly extending tubes arranged in each of said containers, said tubes being open at both ends, the lower end of said tubes having a cone-like enlargement and terminating at a distance above said porous bottoms, and conveying means connected with the upper ends of a predetermined number of tubes in each of said containers, said conveying means leading from the tube of a container to an adjacent container.

12. In an apparatus as claimed in claim 11, the bottom of each container being divided into a plurality of fields, and each of said fields being associated with a tube of said tubes.

13. In an apparatus as claimed in claim 11, the tubes in each container being of different length.

14. In an apparatus as claimed in claim 11, said conveying means being in the shape of a bent pipe.

15. In an apparatus as claimed in claim 11, said conveying means being in the shape of a bent pipe, and said bent pipe being rotatably mounted on its associated tube.

References Cited in the file of this patent

UNITED STATES PATENTS

| | | |
|---|---|---|
| 2,125,913 | Goebels | Aug. 9, 1938 |
| 2,205,525 | Goebels | June 25, 1940 |
| 2,596,220 | Dodds | May 13, 1952 |

FOREIGN PATENTS

| | | |
|---|---|---|
| 539,141 | Germany | Nov. 21, 1931 |
| 882,182 | France | May 20, 1943 |